United States Patent [19]
Reidick

[11] Patent Number: 5,376,181
[45] Date of Patent: Dec. 27, 1994

[54] NOZZLE ASSEMBLY

[75] Inventor: Heinz Reidick, Oberhausen, Germany

[73] Assignee: EVT Energie - und Verfahrenstechnik, Stuttgart, Germany

[21] Appl. No.: 115,478

[22] Filed: Sep. 1, 1993

[30] Foreign Application Priority Data

Sep. 12, 1992 [DE] Germany .............................. 4230608

[51] Int. Cl.⁵ .......................... B08B 9/093; B01J 8/44
[52] U.S. Cl. .................................. 134/22.18; 15/406;
422/143; 422/311; 431/7; 431/121; 431/170
[58] Field of Search ........................ 239/112, 556, 340;
422/311, 143, 139; 34/57 A; 110/245; 122/4 D;
431/7, 170, 121; 15/406; 134/22.12, 22.18

[56] References Cited
U.S. PATENT DOCUMENTS

| | | | |
|---|---|---|---|
| 2,953,248 | 9/1960 | Troland | 239/112 X |
| 2,957,757 | 10/1960 | Coates et al. | 422/143 |
| 3,000,036 | 9/1961 | Benedetti | 15/406 |
| 3,277,582 | 10/1966 | Munro et al. | 422/311 X |
| 4,475,467 | 10/1984 | Korenberg | 110/245 |
| 4,604,050 | 8/1986 | Henriksson | 431/7 X |
| 5,014,632 | 5/1991 | Isaksson | 422/311 X |

FOREIGN PATENT DOCUMENTS 2307304 2/1973 Germany .
3224909.8 7/1982 Germany .

Primary Examiner—Amalia L. Santiago
Attorney, Agent, or Firm—Chilton, Alix & Van Kirk

[57] ABSTRACT

A nozzle assembly which comprises nozzle duct having inlet and discharge ends is provided with a tubular support. The support has a first end in fluid communication with the nozzle duct adjacent the discharge end thereof. The second end of the support extends to a location where it is accessible, to enable a source of cleaning fluid to be coupled thereto, and is normally capped.

10 Claims, 1 Drawing Sheet

NOZZLE ASSEMBLY

BACKGROUND OF THE INVENTION

The present invention relates to the supplying of air to a combustion chamber and particularly to the cleaning of nozzles through which air is delivered to a fluidized-bed reactor. More specifically, this invention is directed to a siphon-type air nozzle having a tubular support which is in fluid communication with the discharge end of the nozzle and especially to a nozzle assembly wherein a pressurized air line may be connected to the support for use in cleaning the air nozzle. Accordingly, the general objects of the invention are to provide novel and improved methods and apparatus of such character.

Siphon-type air nozzles are well known for use in fluidized-bed reactors. Published German Patent Application No. 3224909 discloses such a nozzle. The prior art siphon-type air nozzles are designed to prevent unburned fuel, ashes and bed material from falling out of the furnace, through the fireproof sheathing of the grid plate, into the plenum chamber i.e., the wind box, by which the air or other gaseous source of oxygen for supporting combustion is supplied to the reactor. However, during operation, the discharge ends of the prior art nozzles nevertheless become partially or completely coated with unburned fuel, ashes and bed material. This coating, by reducing the size of the nozzles, affects the air intake to the furnace. Partially coated or clogged air nozzles are hard to clean or cannot be cleaned at all. Cleaning the air nozzles or replacing the air nozzles, fireproof sheathing or either grid plate are lengthy operations with correspondingly high costs.

SUMMARY OF THE INVENTION

The present invention overcomes the above briefly discussed and other deficiencies and disadvantages of the prior art by providing a fluidized bed reactor having a novel nozzle assembly which can be easily, efficiently, quickly and inexpensively cleaned. The invention also encompasses a novel cleaning technique which is practiced with the nozzle assembly of the invention.

A nozzle assembly in accordance with a preferred embodiment of this invention comprises an air nozzle duct having an inlet end which typically extends through the grid plate of a fluidized-bed reactor into a plenum chamber. The nozzle assembly duct further has a discharge end which extends through fireproof sheathing into a furnace or other reactor. The nozzle assembly also has a tubular support for the duct, the support having a first end in fluid communication with the duct immediately upstream of the duct discharge end. The second end of the tubular support extends through the grid plate into the plenum chamber. Means are provided for capping the second end of the tubular support whereby a supply of pressurized cleaning gas may selectively be coupled to the second end of the support.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which.

DESCRIPTION OF THE DISCLOSED EMBODIMENTS

Figure 1:
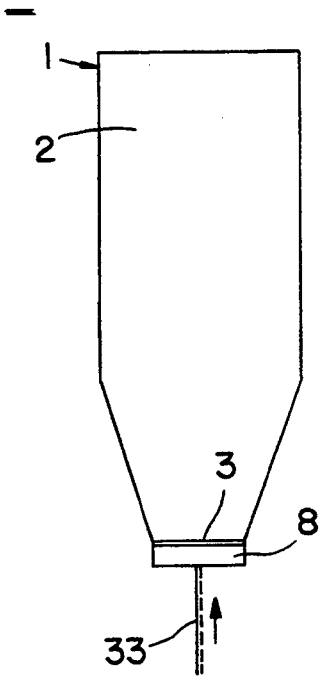
FIG. 1 is a schematic side elevational view of a fluidized bed reactor with which the invention may be associated.
Figure 2:
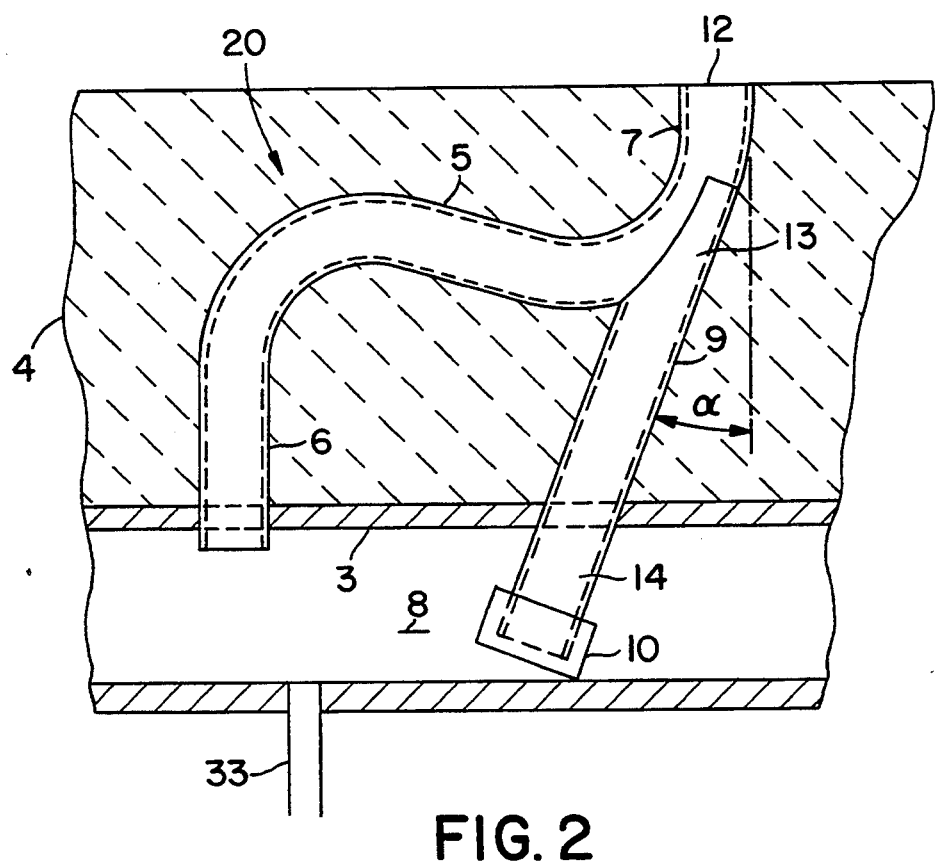
FIG. 2 is a sectional view of the preferred embodiment of a nozzle assembly in accordance with the invention.

With reference now to the drawing, a nozzle assembly in accordance with the present invention is indicated generally at 20 in FIG. 2. The nozzle assembly 20 comprises an air nozzle duct 5 having inlet and discharge end portions respectively indicated at 6 and 7. Nozzle inlet end portion 6 is shown extending through a base plate 3 of the reactor grid plate into a plenum chamber or wind box 8. Nozzle discharge end portion 7 is shown extending through fireproof sheathing 4 into the combustion chamber 2 of a furnace which may be a fluidized-bed reactor indicated generally at 1 in FIG. 1. The terminus of nozzle discharge end portion 7 defines an outlet port 12. A tubular support 9 for the duct 5 has a first end 13 in fluid communication with the discharge end 7, of duct 5. The point at which tubular support 9 communicates with duct 5 is located a short distance upstream of port 12. The support 9 has a second end 14 extending through the base plate 3 into the plenum chamber 8. The second end 14 of support 9 is provided with a removable cap. The means by which cap 10 is removably coupled to tubular support 9 has not been depicted in the drawing and numerous possibilities will be obvious to those skilled in the art. Also not shown, but consistent with conventional fluidized bed reactor construction, is an access hatch whereby service may be performed in the plenum chamber 8.

In the disclosed embodiment, the outlet port 12 is finished flush with the furnace side surface of the fireproof sheathing 4 as shown. The nozzle may, however, project into the furnace.

The air nozzle duct discharge end 7 defines a first axis and the tubular support 9 defines a second axis. The second axis intersects the first axis at an angle $\alpha$ of less than about 20°.

Figure 3:
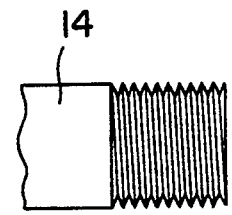
FIG. 3 is a detail of a modified form of the second end of the support of the apparatus depicted in FIG. 2.

In an alternative construction, as shown in FIG. 3, the end 14 is of support 9 which projects into plenum 8 is configured for coupling to a pressurized air line. The coupling means is not limited to the threaded connection illustrated.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A fluidized bed reactor comprising:
vessel means defining a fluidized bed combustion chamber, said vessel means including a base plate at a lower portion thereof, a fireproof sheathing positioned inwardly from said base plate with respect to the combustion chamber, the fireproof sheathing having a combustion chamber side and an opposite side which faces the base plate, a plenum chamber at least partly defined by and below said base plate, means for supplying gas under pressure into said plenum chamber, and at least a first nozzle assembly extending through said base plate and sheathing for delivery of the pressurized gas from said plenum chamber to the combustion chamber, said nozzle assembly comprising:

an air nozzle duct having a first portion defining an inlet end and a second portion defining a discharge end, said inlet end extending through said base plate to be in fluid communication with said plenum chamber, said discharge end extending through said fireproof sheathing to be in fluid communication with the combustion chamber;

a tubular support for said duct, said support having a first end in fluid communication with said duct second portion and a second end extending through said base plate into said plenum chamber; and means for selectively capping said second end of said support, said capping means being removable to permit a cleaning fluid to be delivered to said duct discharge end via said tubular support.

2. The reactor of claim 1 wherein the air nozzle duct is a siphon air nozzle.

3. The reactor of claim 1 wherein said duct second portion defines a first axis and said tubular support first end defines a second axis, said second axis intersecting said first axis at an angle of less than about 20°.

4. The reactor of claim 1 wherein said duct discharge end has a terminus defining an air nozzle outlet port, said terminus being flush with the combustion chamber side of fireproof sheathing 5. The reactor of claim 3 wherein said first axis is oriented vertically.

6. The reactor of claim 1 wherein said second end of said support further comprises coupling means for connecting said tubular support to a source of pressurized fluid.

7. The reactor of claim 3 wherein said second end of said support further comprises coupling means for connecting said tubular support to s source of pressurized fluid.

8. The reactor of claim 5 wherein said second end of said support further comprises coupling means for connecting said tubular support to a source of pressurized fluid.

9. The reactor of claim 8 wherein the air nozzle duct is a siphon air nozzle.

10. A method for cleaning en air nozzle assembly of a fluidized bed reactor, said method comprising:

providing a fluidized bed reactor having vessel means defining a fluidized bed combustion chamber, said vessel means including a base plate and a fireproof sheathing positioned inwardly from said base plate with respect to the combustion chamber, said fireproof sheathing having a combustion chamber side and an opposite side which faces said base plate, said fluidized bed reactor further comprising a plenum chamber at least partly defined by and located outwardly with respect to the combustion chamber from said base plate, said reactor additionally comprising means for supplying gas under pressure into said plenum chamber, the reactor also comprising at least a first nozzle assembly extending through said base plate and sheathing for delivery of pressurized gas from said plenum chamber to the combustion chamber, said nozzle assembly including a duct and a tubular duct support, said air nozzle duct having a first portion defining an inlet end and a second portion defining a discharge end, said inlet end extending through said base plate to be in fluid communication with said plenum chamber, said discharge end extending through fireproof sheathing to be in fluid communication with the combustion chamber, said tubular support having a first end in fluid communication with said duct second portion and a second end extending through said base plate into said plenum chamber, said tubular support second end being provided with a removable end cap which normally prevents fluid from said plenum chamber from flowing through said tubular support;

removing the end cap from said tubular support;

coupling a source of pressurized cleaning fluid to the second end of the tubular support in the plenum chamber;

causing pressurized cleaning fluid to flow from the source thereof into the nozzle assembly via the tubular support;

disconnecting the source of cleaning fluid from the tubular support; and reinstalling the end cap on the tubular support.

* * * * *